(12) United States Patent
Kumata

(10) Patent No.: US 6,289,043 B1
(45) Date of Patent: Sep. 11, 2001

(54) DATA COMMUNICATION DEVICE

(75) Inventor: Junichi Kumata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/358,281

(22) Filed: Jul. 21, 1999

(30) Foreign Application Priority Data

Jul. 22, 1998 (JP) .................................................. 10-206628

(51) Int. Cl.[7] .............................. H04B 1/38; H04L 5/16
(52) U.S. Cl. ........................... 375/220; 375/257; 714/712
(58) Field of Search .................................... 375/220, 213, 375/224, 225, 228, 257; 370/540, 252, 242; 307/112, 116, 125; 340/825.06, 825.01, 827, 825.16, 825.17, 825.36, 825.49; 714/25, 43, 56, 712, 715, 704

(56) References Cited

U.S. PATENT DOCUMENTS 5,473,597 * 12/1995 Yajima .................................. 370/249
5,862,145 * 1/1999 Grossman et al. ..................... 371/5.1

* cited by examiner

*Primary Examiner*—Chi Pham
*Assistant Examiner*—Phuong Phu
(74) *Attorney, Agent, or Firm*—Ostrolenk, Faber, Gerb & Soffen, LLP

(57) ABSTRACT

A data communication apparatus and a storage medium storing therein a program enable error connection of cable to be detected in the case where a plurality of low speed SHELVes are connected to a high speed SHELF through cables respectively. A collation code from a low speed SHELF to be a second communication device is received by a high speed SHELF to be a first communication device, before judging whether it is the collation code from an interface unit 102 or it is the collation code from an interface 103. When the collation code is outputted from the interface 103, it is judged of the error connection of the cable. Further a collation code from a high speed SHELF is received by the low speed SHELF, when established SHELF number does not agree with the collation code, it is judged as the error connection of the cable.

6 Claims, 4 Drawing Sheets

F I G. 1
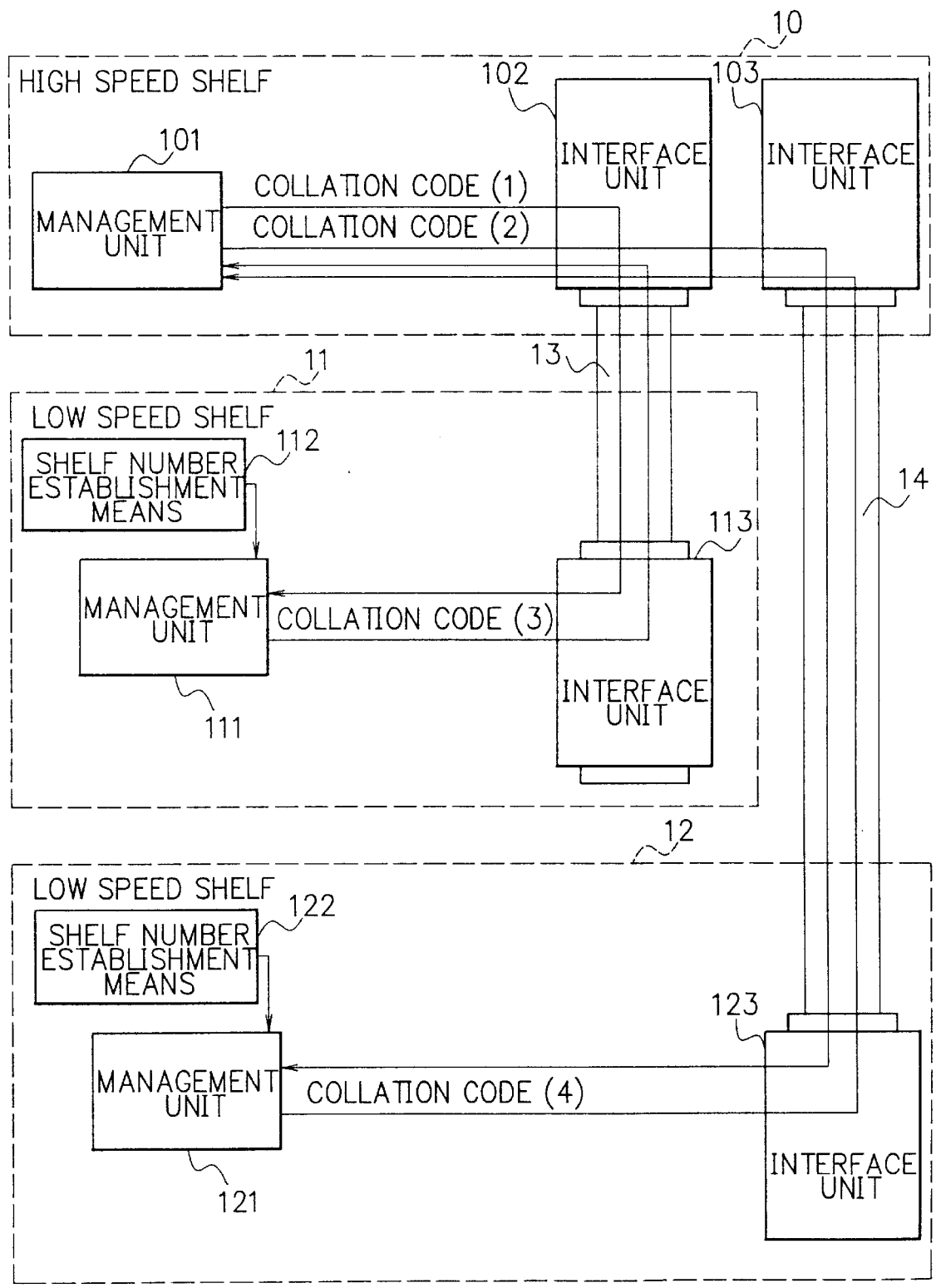

DATA COMMUNICATION DEVICE

BACKGROUND OF THE INVENTION

The present invention relates to a data communication device and a storage medium storing therein a program which are suitable for the sake of communication and so forth of the data among a high speed SHELF and a low speed SHELF.

DESCRIPTION OF THE PRIOR ART

Formerly, the data communication device and the storage medium storing therein a program are not provided with a contrivance for detecting connection error regarding a cable connection between a high speed SHELF and a low speed SHELF. For that reason, when there occurs the error connection, the conventional data communication apparatus judges the error from the condition of the data undergoing error after implementing the practical communication of the data.

However, it is difficult to judge whether the error occurs caused by error connection of the cable or the error occurs caused by an another main cause from the error condition of the data as above described conventional example, thus there is the problem that it is incapable of being detected the error connection of the cable speedily and surely.

SUMMARY OF THE INVENTION

In view of the foregoing it is an object of the present invention, in order to overcome the above mentioned problem, to provide a data communication apparatus and a storage medium storing therein a program which enable an error connection of a cable between communication apparatus such as a high speed SHELF and a low speed SHELF to be detected speedily and surely.

According to a first aspect of the present invention, in order to achieve the above-mentioned object, there is provided a data communication apparatus in which a first communication device and a second communication device are connected by means of a prescribed connection means provided with a plurality of cables, which comprises a first collation information transmission means provided for the first communication device for transmitting a plurality of first collation information to respective prescribed connection means, a second collation means provided for the respective second communication devices for collating own peculiar collation information while receiving the first collation information, a second collation information transmission means provided for the respective second communication devices for transmitting a second collation information to the prescribed connection means, and a first collation means provided for the first communication device for collating own collation information while receiving the second collation information.

According to a second aspect of the present invention, in the first aspect, there is provided a data communication apparatus, which further comprises a display means for displaying collation result according to the first and the second collation means.

According to a third aspect of the present invention, in the first aspect, there is provided a data communication apparatus, wherein the first communication device is a high speed SHELF which processes high speed signal, and the second communication device is a low speed SHELF which processes low speed signal.

According to a fourth aspect of the present invention, there is provided a storage medium storing therein a program which executes processes comprising a process for transmitting a plurality of first collation information by means of respective prescribed connection means in the first communication device, a process for collating the first collation information with own peculiar collation information while receiving the first collation information in the second communication device, a process for transmitting a second collation information to the prescribed connection means in the second communication device, and a process for collating the second collation information with peculiar collation information in the first communication device.

According to a fifth aspect of the present invention, in the fourth aspect, there is provided a storage medium storing therein a program which executes processes, further comprising a process for displaying result of the collation.

According to a sixth aspect of the present invention, in the fourth aspect, there is provided a storage medium storing therein a program which executes processes, wherein the first communication device is a high speed SHELF which processes a high speed signal, and the second communication device is a low speed SHELF which processes a low speed signal.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a block diagram showing a first embodiment of the present invention.

DETAILED DESCRIPTION OF THE PREFERRED EMBODIMENT

Figure 2:
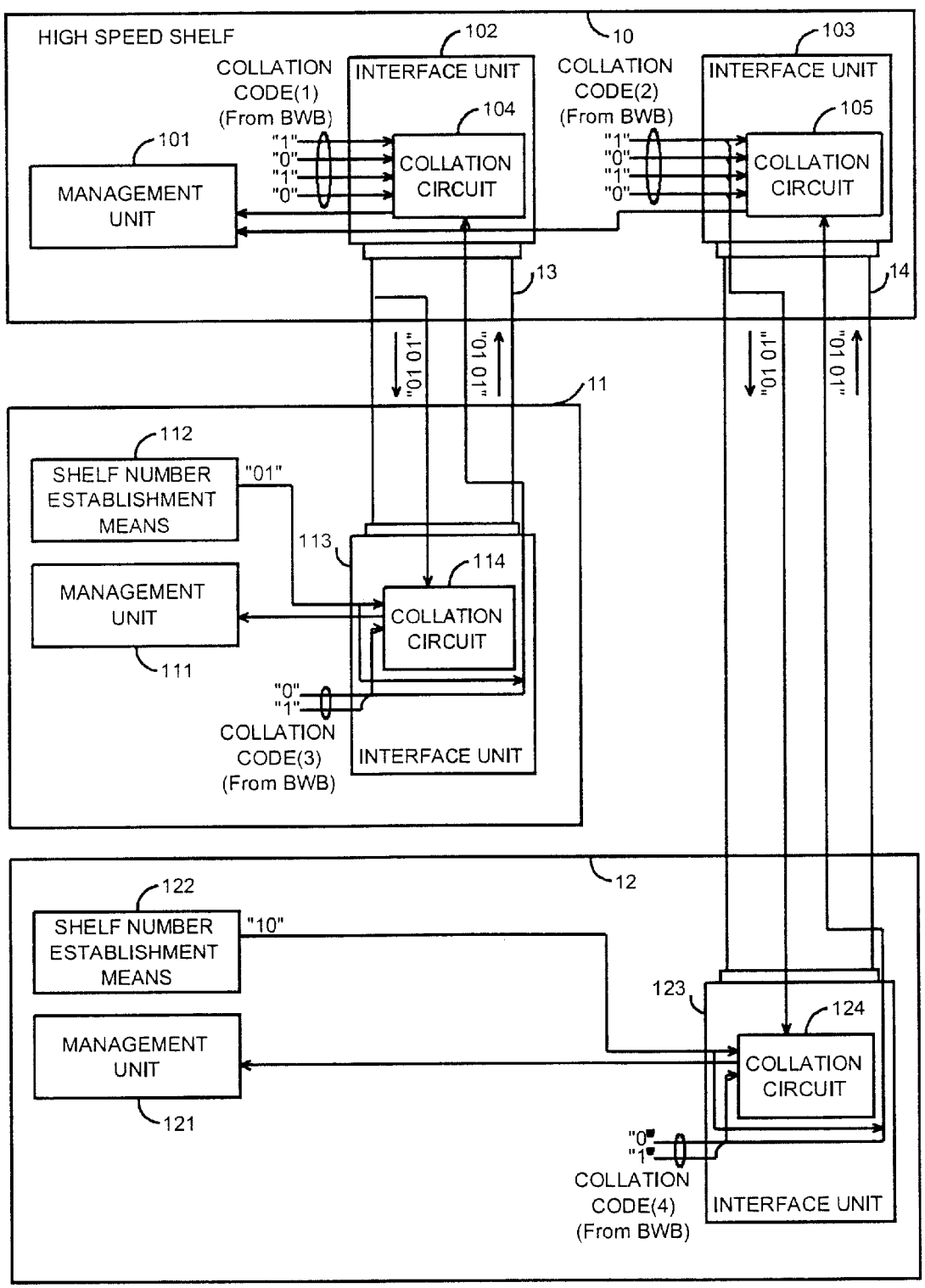
FIG. 2 is a block diagram showing a second embodiment of the invention.

A preferred embodiment of the present invention to be a data communication apparatus and a storage medium storing therein a program will now be described in detail in accordance with the accompanying drawings. The data communication apparatus to be the embodiment of the present invention comprises a high speed SHELF for processing high speed signal as a first communication device and a low speed SHELF for processing low speed signal as a second communication device. Respective two low speed SHELVes are connected to the high speed SHELF through the cables. In the data communication apparatus, a management unit is provided for each the high speed SHELF or the low speed SHELF. Collation information is transmitted between the management units mutually to supervise with each other, thus the error connection of the cable is capable of being detected.

FIG. 1 is a block diagram showing a data communication apparatus to be the first embodiment of the present invention. In FIG. 1, the data communication apparatus which is the present embodiment comprises a high speed SHELF 10 as a first communication device for processing high speed signal, and two low speed SHELVes 11, 12 as second communication devices for processing low speed signal. The management units 101, 111, and 121 for managing respective SHELVes are provided for respective SHELVes 10 to 12. Further, SHELF number establishment means 112, and 122 for establishing number of the SHELF (mounting position to the high speed SHELF 10) are provided for the low speed SHELVes 11, and 12.

Two interface units 102, and 103 are provided for the high speed SHELF 10. An interface unit 113 is provided for the low speed SHELF 11, thus being connected to the interface unit 102 through the cable 13. An interface unit 123 is provided for the low speed SHELF 12, thus being connected to the interface unit 103 through the cable 14. Further collation codes (1), and (2) are outputted from the management unit 101, a collation code (3) is outputted from the management unit 111, and a collation code (4) is outputted from the management unit 121.

Next, an operation example will be described in the first embodiment of the present invention.

The SHELF number establishment means 112, and 122 which establish respective SHELF numbers, are provided for the low speed SHELVes 11, 12, when respective SHELVes 11, and 12 are connected to the interface units 102, and 103 existing in prescribed position of the high speed SHELF 10 through the cables 13, and 14, respective SHELF numbers are established.

Firstly, there will be described the case where a signal direction is directed to the high speed SHELF 10 from the low speed SHELVes 11, and 12. The management unit 111 of the low speed SHELF 11 receives the SHELF number from the SHELF number establishment means 112, thus transmitting a collation code (3) corresponding thereto. The collation code (3) is received at the management unit 101 of the high speed SHELF 10 through the interface unit 113, the cable 13, and the interface unit 102. The management unit 101 judges whether the collation code (3) is from the interface unit 102 or from the interface unit 103.

The management unit 101 has a corresponding table between respective interface units and respective collation codes, thus above judgement is implemented using the table. When the collation code (3) is outputted from the interface unit 103, the error connection of the cable is decided to give the alarm by indication of a voice, a lump, a screen, or the like. Also, when the collation code (4) from the low speed SHELF 12 is outputted, the judgement similarly to the above case is implemented.

Next, there will be described the case where the signal is transmitted in the direction from the high speed SHELF 10 to the low speed SHELF 11. The management unit 101 of the high speed SHELF 10 outputs a prescribed collation code (1) to transmit to the management unit 111 through the interface unit 102, the cable 13, and the interface unit 113.

The management unit 111 has the corresponding table between the above described established SHELF number and the collation code, thus implementing judgement using this table. When the SHELF number is not agreed with the collation code transmitted, the apparatus gives the alarm to the operator while judging that the error connection of the cable is detected. Also in the case where the signal is transmitted from the high speed SHELF 10 to the low speed SHELF 12 which is the same as that the above-described case. Further, the signal is supervised in both directions to be possible to separate the cable according to the signal direction.

FIG. 2 is a block diagram showing a second embodiment of the present invention.

In FIG. 2, collation circuits 104, and 105 are provided for the interface units 102, and 103 of the high speed SHELF 10, while collation circuits 114, and 124 are provided for the interface units 113, and 123 of the low speed SHELVes 11, and 12.

Figure 3:
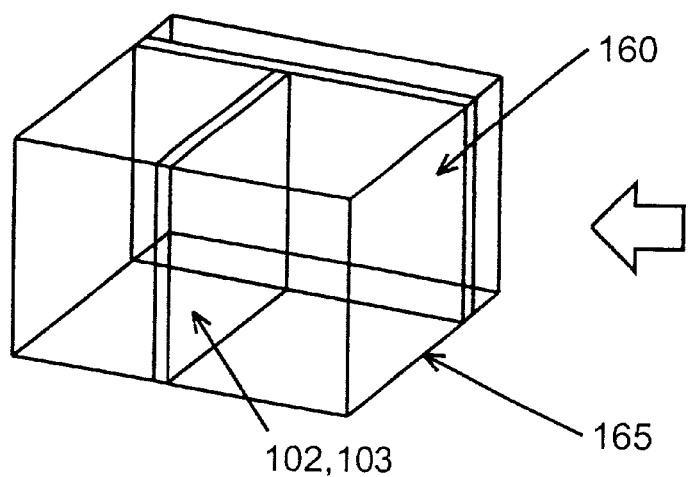
FIG. 3 is a perspective view of a box-shaped body with a backboard having an interface unit mounted thereon.
Figure 4:
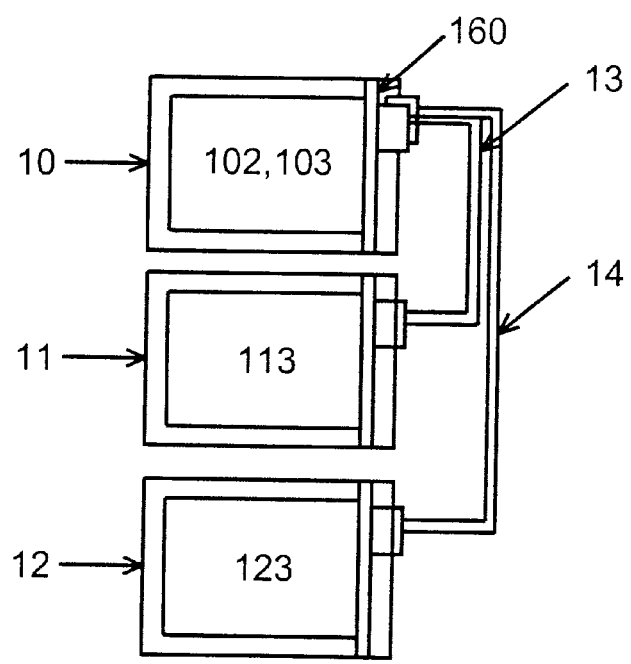
FIG. 4 is a side elevational view of interface units mounted on a backboard and interconnected with cables.
Figure 5:
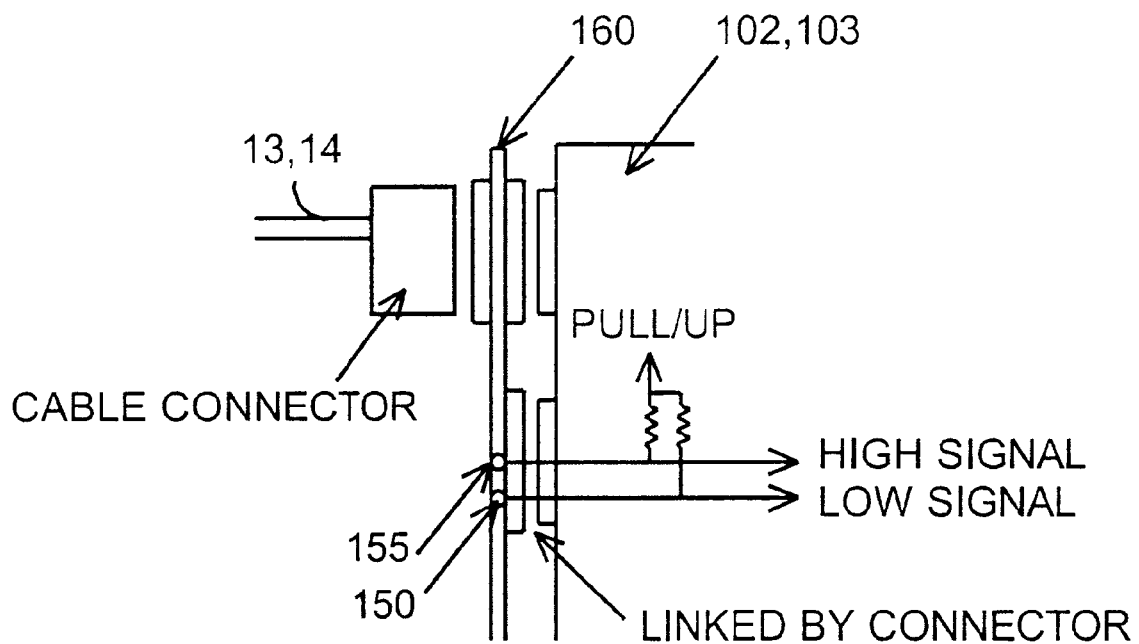
FIG. 5 is a partial side elevational view, drawn to an enlarged scale, of an interface unit mounted on a backboard.

In the present embodiment, referring also to FIG. 3–5 for instance, collation codes (1) to (4) in respective SHELVes 10 to 12 are capable of forming collation code of 2 (two) bits in such a way that ground terminal 150 or unoccupied terminal 155 in backboard 160 of box shaped body 165 of respective SHELVes 10 to 12 are utilized, thus being connected to these terminals selectively. Then the collation codes are transmitted to the collation circuits 104, and 105 of the high speed SHELF 10 as collation code of 4 (four) bits while adding to the SHELF number of 2 (two) bits established by the SHELF number establishment means 112, and 122 at the time of cable connection to be collated. For that reason, it is capable of being judged the error connection of the cable.

In this case, the collation code of 2 (two) bits denotes mounting position of the low speed SHELVes 11, and 12, while the SHELF number of 2 (two) bits denotes connection of the cables 13, and 14. In the first embodiment of the present invention, the same manner is capable of being applied.

When the signal direction is directed to the low speed SHELVes 11, and 12, from the high speed SHELF 10, it is capable of being judged the error connection of the cable in such a way that the collation codes (1), and (2) from the high speed SHELF 10 is transmitted to the collation circuits 104, and 105 of the low speed SHELVes 11, and 12 to be collated.

As described above, according to the first embodiment of the present invention, the data communication apparatus is realized by software, while in the second embodiment of the present invention, the data communication apparatus is realized by hardware. In this second embodiment, it is capable of being realized the data communication apparatus particularly, without adding parts and so forth because the terminal of the backboard is utilized.

Furthermore, the storage medium used for the present invention is capable of being used an optical disk, an optical magnetic disk, a semiconductor memory, a magnetic storage medium, or the like.

As is clear from the above description, according to the communication apparatus and the storage medium storing therein the program, it is capable of being detected the error connection of the cable in between respective communication apparatus. Further, it is capable of being noticed the error connection of the cable immediately to the operator by the alarm.

While preferred embodiments of the invention have been described using specific terms, the description has been for illustrative purpose only, and it is to be understood that changes and variations may be made without departing from the spirit or scope of the following claims.

What is claimed is:

1. A data communication apparatus comprising:
    a first communication device including a first interface unit connected to a first end of one of a plurality of cables;
    a plurality of second communication devices, each including a second interface unit respectively connected to a second end of one of the cables;
    the first communication device being operative to transmit a unique one of a plurality of first collation codes respectively to each of the cables;

each of the second communication devices including a first identification circuit that stores data identifying the one of the first collation codes uniquely associated with the cable to which that second communication device is connected;

each of the second communication devices being operative to compare a collation code received over the connected cable with the collation code stored in the identification circuit and to provide a first output indicative of the comparison;

each of the second communication devices being further operative to transmit one of a plurality of second collation codes to the cable connected thereto, each of the second collation codes being uniquely associated with the second communication unit by which it is transmitted;

the first communication device including a second identification circuit that stores collation data associating each of the second collation codes with the cable to which the respective second communication device is connected, the first communication device being further operative to compare a received second collation code and the identity of the cable over which the collation code was received with the data stored in the second identification circuit and to provide a second output indicative of the comparison.

2. A data communication apparatus as described in claim 1, further including a display device that displays the first and said second outputs.

3. A data communication apparatus as described in claim 1 further comprised of:

a common support structure on which the first communication device, the plurality of second communication devices and the plurality of cables are mounted; and a connection device mounted on the common support structure, the connection device being comprised of:
a backboard, a plurality of first couplers mounted on the backboard that connect the first interface unit to a cable connector on the first end of each of the cables, and a plurality of second couplers mounted on the backboard that respectively connect one of the second interface units to a cable connector on the second end of one of the cables.

4. A data communication apparatus as described in claim 3, in which the first interface unit is comprised of a plurality of individual connectors, each respectively connected to one of the first couplers.

5. A data communication apparatus as described in claim 3, in which each of the cables, provides a separate signal path for transmission of the first and second collation codes.

6. A method of determining cable connection integrity in a data communications apparatus comprising a first communication device including a first interface unit connected to a first end of one of a plurality of cables, and a plurality of second communication devices, each including a second interface unit respectively connected to a second end of one of the cables, comprising:

transmitting a unique one of a plurality of first collation codes from the first communication device respectively to each of the cables;

storing, in a first identification circuit at each of the second communication devices, data identifying the one of the first collation codes uniquely associated with the cable to which that second communication device is connected;

performing a first comparison, at each of the second communication devices, of a collation code received over the connected cable from the first communication device, with the collation identifying data stored in the first identification circuit;

providing a first output indicative of the first comparison;

transmitting one of a plurality of second collation codes from each of the second communication devices to the cable connected thereto, each of the second collation codes being uniquely associated with the second communication unit by which it is transmitted;

storing, in a second identification circuit at the first communication device, collation data that associates each of the second collation codes with the cable to which the respective second communication device is connected, performing a second comparison at the first communication device, of a received second collation code and the identification of the cable over which the collation code was received with the data stored in the second identification circuit; and providing a second output indicative of the second comparison.

* * * * *